US008488614B1

(12) United States Patent
Aggarwal

(10) Patent No.: US 8,488,614 B1
(45) Date of Patent: Jul. 16, 2013

(54) UPSTREAM LABEL ASSIGNMENT FOR THE LABEL DISTRIBUTION PROTOCOL

(75) Inventor: Rahul Aggarwal, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 425 days.

(21) Appl. No.: 12/951,885

(22) Filed: Nov. 22, 2010

Related U.S. Application Data

(63) Continuation of application No. 11/566,480, filed on Dec. 4, 2006, now Pat. No. 7,839,862.

(60) Provisional application No. 60/817,899, filed on Jun. 30, 2006.

(51) Int. Cl.
*H04L 12/28* (2006.01)

(52) U.S. Cl.
USPC ... 370/395.3; 370/349; 370/395; 370/395.53; 370/401; 370/460; 370/464; 370/466

(58) Field of Classification Search
None
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,466,985 B1 | 10/2002 | Goyal et al. | |
| 6,477,166 B1 | 11/2002 | Sanzi et al. | |
| 6,493,349 B1 | 12/2002 | Casey | |
| 6,501,754 B1 | 12/2002 | Ohba et al. | |
| 6,553,028 B1 | 4/2003 | Tang et al. | |
| 6,571,218 B1 | 5/2003 | Sadler | |
| 6,597,703 B1 | 7/2003 | Li et al. | |
| 6,611,528 B1 | 8/2003 | Farinacci et al. | |
| 6,625,773 B1 | 9/2003 | Boivie et al. | |
| 6,731,652 B2 | 5/2004 | Ramfelt et al. | |
| 6,778,531 B1 | 8/2004 | Kodialam et al. | |
| 6,807,182 B1 | 10/2004 | Dolphin et al. | |
| 6,879,594 B1 | 4/2005 | Lee et al. | |

(Continued)

FOREIGN PATENT DOCUMENTS

| | | |
|---|---|---|
| JP | 2005-086222 | 3/2005 |
| JP | 2005-130258 | 5/2005 |

(Continued)

OTHER PUBLICATIONS

Satyanarayana et al., "Extensions to GMPLS RSVP Graceful Restart", draft-aruns-ccamp-restart-ext-01.txt, Jul. 2004, Network Working Group Internet Draft, 23 pgs.

(Continued)

*Primary Examiner* — John Blanton
*Assistant Examiner* — Aixa A Guadalupe Cruz
(74) *Attorney, Agent, or Firm* — Shumaker & Sieffert, P.A.

(57) ABSTRACT

The invention is directed toward techniques for Multi-Protocol Label Switching (MPLS) upstream label assignment for the Label Distribution Protocol (LDP). The techniques include extensions to the LDP that enable distribution of upstream assigned labels from an upstream router to two or more downstream routers of a tunnel established over a network. The tunnel may comprise a LDP Point to Multi-Point (P2MP) Label Switched Path (LSP), an Internet Protocol (IP) multicast tunnel, or a Resource Reservation Protocol with Traffic Engineering extensions (RSVP-TE) P2MP LSP. The techniques also include extensions to the LDP that enable a router to advertise upstream label assignment capability to neighboring routers in the network. The MPLS upstream label assignment using LDP described herein enables a branch router to avoid traffic replication on a Local Area Network (LAN) for LDP P2MP LSPs.

8 Claims, 8 Drawing Sheets

U.S. PATENT DOCUMENTS

| | | |
|---|---|---|
| 6,920,503 B1 | 7/2005 | Nanji et al. |
| 6,968,389 B1 | 11/2005 | Menditto et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,251,218 B2 | 7/2007 | Joregensen |
| 7,269,135 B2 | 9/2007 | Frick et al. |
| 7,281,058 B1 | 10/2007 | Shepherd et al. |
| 7,296,090 B2 | 11/2007 | Jamieson et al. |
| 7,330,468 B1 | 2/2008 | Tse-Au |
| 7,333,491 B2 | 2/2008 | Chen et al. |
| 7,359,328 B1 | 4/2008 | Allan |
| 7,359,393 B1 | 4/2008 | Nalawade et al. |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,489,695 B1 | 2/2009 | Ayyangar |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,532,624 B2 | 5/2009 | Ikegami et al. |
| 7,545,735 B1 | 6/2009 | Shabtay et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,570,604 B1 | 8/2009 | Aggarwal et al. |
| 7,570,605 B1 | 8/2009 | Aggarwal et al. |
| 7,570,638 B2 | 8/2009 | Shimizu et al. |
| 7,590,115 B1 | 9/2009 | Aggarwal et al. |
| 7,593,405 B2 | 9/2009 | Shirazipour et al. |
| 7,602,702 B1 | 10/2009 | Aggarwal |
| 7,633,859 B2 | 12/2009 | Filsfils et al. |
| 7,742,482 B1 | 6/2010 | Aggarwal |
| 7,768,925 B2 | 8/2010 | He et al. |
| 7,787,380 B1 | 8/2010 | Aggarwal et al. |
| 7,797,382 B2 | 9/2010 | Bou-Diab |
| 7,804,790 B1 | 9/2010 | Aggarwal et al. |
| 7,830,787 B1 | 11/2010 | Wijnands et al. |
| 7,856,509 B1 | 12/2010 | Kodeboyina |
| 7,925,778 B1 | 4/2011 | Wijnands et al. |
| 2002/0071390 A1 | 6/2002 | Reeves et al. |
| 2002/0109879 A1 | 8/2002 | Wing So |
| 2002/0116669 A1 | 8/2002 | Jain |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0016672 A1 | 1/2003 | Rosen et al. |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0056007 A1 | 3/2003 | Katsube et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0191937 A1 | 10/2003 | Balissat et al. |
| 2003/0210705 A1 | 11/2003 | Seddigh et al. |
| 2004/0032856 A1 | 2/2004 | Sandstrom |
| 2004/0034702 A1 | 2/2004 | He |
| 2004/0037279 A1 | 2/2004 | Zelig et al. |
| 2004/0042406 A1 | 3/2004 | Wu et al. |
| 2004/0047342 A1 | 3/2004 | Gavish et al. |
| 2004/0081154 A1 | 4/2004 | Kouvelas |
| 2004/0100951 A1 | 5/2004 | O'neill |
| 2004/0133692 A1 | 7/2004 | Blanchet et al. |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0213160 A1 | 10/2004 | Regan et al. |
| 2004/0218536 A1 | 11/2004 | Yasukawa et al. |
| 2004/0240445 A1 | 12/2004 | Shin et al. |
| 2004/0240446 A1 | 12/2004 | Compton |
| 2005/0001720 A1 | 1/2005 | Mason et al. |
| 2005/0013295 A1 | 1/2005 | Regan et al. |
| 2005/0018693 A1 | 1/2005 | Dull |
| 2005/0025156 A1 | 2/2005 | Smathers |
| 2005/0027782 A1 | 2/2005 | Jalan et al. |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0129001 A1 | 6/2005 | Backman et al. |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2006/0262735 A1 | 11/2006 | Guichard et al. |
| 2006/0262786 A1 | 11/2006 | Shimizu et al. |
| 2007/0025276 A1 | 2/2007 | Zweibel et al. |
| 2007/0025277 A1 | 2/2007 | Sajassi et al. |
| 2007/0036162 A1 | 2/2007 | Tingle et al. |
| 2007/0076709 A1 | 4/2007 | Mattson et al. |
| 2007/0091891 A1 | 4/2007 | Zwiebel et al. |
| 2007/0098003 A1 | 5/2007 | Boers et al. |
| 2007/0104119 A1 | 5/2007 | Sarkar et al. |
| 2007/0124454 A1 | 5/2007 | Watkinson |
| 2007/0129291 A1 | 6/2007 | Tian |
| 2007/0140107 A1 | 6/2007 | Eckert et al. |
| 2007/0177593 A1 | 8/2007 | Kompella |
| 2007/0177594 A1 | 8/2007 | Kompella |
| 2007/0189177 A1 | 8/2007 | Zhai |
| 2008/0056258 A1 | 3/2008 | Sharma et al. |
| 2008/0112330 A1 | 5/2008 | He et al. |
| 2008/0123524 A1 | 5/2008 | Vasseur et al. |
| 2008/0123654 A1 | 5/2008 | Tse-Au |
| 2008/0291921 A1 | 11/2008 | Du et al. |
| 2009/0028149 A1 | 1/2009 | Yasukawa et al. |
| 2009/0122732 A1 | 5/2009 | Brockners et al. |
| 2009/0175274 A1 | 7/2009 | Aggarwal et al. |
| 2009/0225650 A1 | 9/2009 | Vasseur |
| 2009/0268731 A1 | 10/2009 | Narayanan et al. |

FOREIGN PATENT DOCUMENTS

| | | |
|---|---|---|
| JP | 2005-167482 | 6/2005 |
| JP | 2005-252385 | 9/2005 |
| JP | 2005-323266 | 11/2005 |
| KR | 2004/001206 A | 1/2004 |
| WO | 02/091670 A2 | 11/2002 |
| WO | 2004/071032 A1 | 8/2004 |

OTHER PUBLICATIONS

Aggarwal et al., "MPLS Upstream Label Assignment and Context Specific Label Space," Network Working Group Internet Draft, Jan. 2005, draft-raggarwa-mpls-upstream-label-00.txt, 9 pgs.

Wijnands et al., "Multicast Extensions for LDP," Network Working Group Internet Draft, Mar. 2005, draft-wijnands-mpls-ldp-mcast-ext-00.txt, 13 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

Zhang et al., "A Destination-initiated Multicast Routing Protocol for Shortest Path Tree Constructions," GLOBECOM 2003, IEEE Global Telecommunications Conference, XP010677629, pp. 2840-2844.

Yasukawa et al., Requirements for point to multipoint extension to RSVP-TE, Oct. 2003.

Wei et al., "Establishing point to multipoint MPLS TE LSPs," Aug. 2004.

Aggarwal et al., "Establishing Point to Multipoint MPLS TE LSPs," submitted to Internet Engineering Task Force (IETF) Feb. 11, 2007, pp. 1-15.

Rekhter et al., "A Border Gateway Protocol 4 (BGP-4)," Mar. 1995, 72 pp.

Atlas et al., "MPLS RSVP-TE Interoperability for Local Protection/Fast Reroute," IETF, Jul. 2001, pp. 1-14.

Rosen et al., "Multicast in MPLS/BGP IP VPNs," draft-rosen-vpn-mcast-07.txt, May 2004, 27 pgs.

Deering et al., "Protocol Independent Multicast-Sparse Mode (PIM-SM): Motivation and Architecture," draft-ietf-idmr-pim-arch-05.txt, Aug. 4, 1998, 30 pgs.

Kompella et al., "Virtual Private LAN Service," draft-ietf-l2vpn-vpls-bgp-00.txt, May 2003, 22 pgs.

Martini et al., "Transport of Layer 2 Frames Over MPLS," Network Working Group Internet Draft, draft-martini-l2circuit-trans-mpls-08.txt, Nov. 2001, 18 pgs.

Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Decraene et al., "LDP Extension for Inter-Area Label Switched Paths (LSPs)," Network Working Group RFC 5283, Jul. 2008, 13 pp.

Decraene et al., "LDP extension for Inter-Area LSP", Network Working Group, draft-ietf-mpls-ldp-interarea-03.txt, Feb. 2008, 12 pp.

Decraene et al., "LDP extensions for Inter-Area LSP", Network Working Group, draft-decraene-mpls-ldp-interarea-02.txt, Jun. 2006, 8 pp.

Kompella, "Layer 2 VPNs Over Tunnels," Network Working Group, Jan. 2006, 27 pp.

Rekhter et al., "Carrying Label Information in BGP-4", Network Working Group, RFC 3107, May 2001, 9 pp.

Andersson et al., "LDP Specification", Network Working Group, RFC 3036, Jan. 2001, (118 pages).

Swallow et al., "Network Scaling with Aggregated IP LSPs", Network Working Group, draft-swallow-mpls-aggregated-fec-00.txt, Jul. 2007, 10 pp.

Shah et al., "Extensions to MPLS-based Layer 2 VPNs," Network Working Group, Sep. 2001, 14 pp.

Office Action from U.S. Appl. No. 11/508,096, dated Jan. 9, 2009, 22 pp.

Response to Office Action dated Jan. 9, 2009, from U.S. Appl. No. 11/508,096, filed Mar. 19, 2009, 13 pp.

Office Action from U.S. Appl. No. 11/508,096, dated Apr. 8, 2009, 17 pp.

Response to Office Action dated Apr. 8, 2009, from U.S. Appl. No. 11/508,096, filed Jul. 30, 2009, 15 pp.

Notice of Allowance from U.S. Appl. No. 11/508,096, dated Sep. 4, 2009, 11 pp.

Notice of Allowance from U.S. Appl. No. 11/508,096, dated Jan. 12, 2010, 14 pp.

U.S. Appl. No. 11/213,638, by Rahul Aggarwal, filed Aug. 26, 2005.
U.S. Appl. No. 11/213, 640, by Rahul Aggarwal, filed Aug. 26, 2005.
U.S. Appl. No. 12/423,640, by Rahul Aggarwal, filed Apr. 14, 2009.
U.S. Appl. No. 12/427,542, by Rahul Aggarwal, filed Apr. 21, 2009.
U.S. Appl. No. 12/469,075, by Rahul Aggarwal, filed May 20, 2009.
U.S. Appl. No. 12/497,078, by Rahul Aggarwal, filed Jul. 2, 2009.
U.S. Appl. No. 12/497,957, by Rahul Aggarwal, filed Jul. 6, 2009.
U.S. Appl. No. 12/497,939, by Rahul Aggarwal, filed Jul. 6, 2009.
U.S. Appl. No. 12/574,428, by Rahul Aggarwal, filed Oct. 6, 2009.
U.S. Appl. No. 12/499,606, by Ina Minei, filed Jul. 8, 2009.
U.S. Appl. No. 11/192,432, by Rahul Aggarwal, filed Jul. 28, 2005.
U.S. Appl. No. 12/404,786, by Rahul Aggarwal, filed Mar. 16, 2009.
U.S. Appl. No. 12/871,784, by Rahul Aggarwal, filed Aug. 30, 2010.
U.S. Appl. No. 12/819,906 by Rahul Aggarwal, filed Jun. 10, 2010.
U.S. Appl. No. 11/566,480, by Rahul Aggarwal, filed Dec. 4, 2006.

Office Action mailed Sep. 14, 2012 in U.S. Appl. No. 12/871,784, 8 pgs.

UPSTREAM LABEL ASSIGNMENT FOR THE LABEL DISTRIBUTION PROTOCOL

This application is a Continuation of application Ser. No. 11/566,480, filed Dec. 4, 2006, now U.S. Pat. No. 7,839,862, which claims the benefit of U.S. Provisional Application No. 60/817,899, filed Jun. 30, 2006, the entire contents of each of which are incorporated herein by reference.

TECHNICAL FIELD

The invention relates to computer networks and, more particularly, to engineering traffic flows within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links As networks grow in size and complexity, the traffic on any given link, including peering links, may approach a maximum bandwidth capacity for the link, thereby leading to congestion and loss.

Multi-Protocol Label Switching (MPLS) is a mechanism used to engineer traffic patterns within Internet Protocol (IP) networks. By utilizing MPLS, a source device can request a path through a network to a destination device, i.e., a Label Switched Path (LSP). An LSP defines a distinct path through the network to carry MPLS packets from the source device to a destination device. Each router along a LSP allocates a label and propagates the label to the closest upstream router along the path. Routers along the path cooperatively perform MPLS operations to forward the MPLS packets along the established path. In order to carry multicast packets, a source device can request a path through a network to multiple destination devices, i.e., a Point to Multi-Point (P2MP) LSP.

In the case of a P2MP LSP, one or more of the routers along the path may comprise branch routers located at points where the path divides. In addition to performing MPLS operations to forward the MPLS multicast packets along the path, the branch routers perform replication of the multicast packets such that each branch of the P2MP LSP continues to carry copies of the multicast packets. A variety of protocols exist for establishing LSPs. For example, the Label Distribution Protocol (LDP), and the Resource Reservation Protocol with Traffic Engineering extensions (RSVP-TE).

SUMMARY

In general, the invention is directed toward techniques for Multi-Protocol Label Switching (MPLS) upstream label assignment for the Label Distribution Protocol (LDP). The techniques include extensions to the LDP that enable distribution of upstream assigned labels from an upstream router to two or more downstream routers of a tunnel established over a network. The tunnel may comprise a LDP Point to Multi-Point (P2MP) Label Switched Path (LSP), an Internet Protocol (IP) multicast tunnel, or a Resource Reservation Protocol with Traffic Engineering extensions (RSVP-TE) P2MP LSP.

The techniques also include extensions to the LDP that enable a router to advertise upstream label assignment capability to neighboring routers in the network. The MPLS upstream label assignment using LDP described herein enables a branch router to avoid traffic replication on a Local Area Network (LAN) for LDP P2MP LSPs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
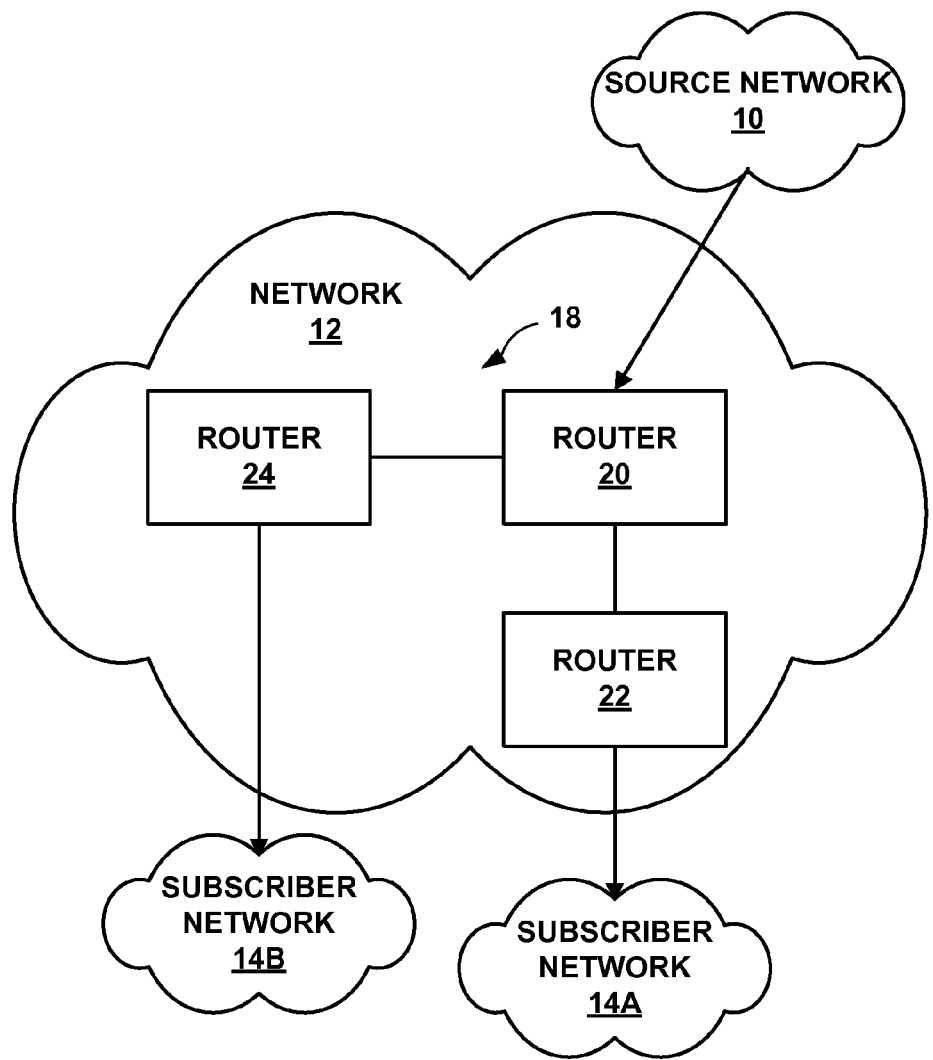
FIG. 1 is a block diagram illustrating an exemplary computer network having a tunnel established over the network between an upstream router and two or more downstream routers.

FIG. 1 is a block diagram illustrating an exemplary computer network 12 having a tunnel 18 established over network 12 between an upstream router 20 and downstream routers 22 and 24. Tunnel 18 may conform to a Multi-Protocol Label Switching (MPLS) tunnel or an Internet Protocol (IP) tunnel. For example, tunnel 18 may comprise a Label Distribution Protocol (LDP) Point to Multi-Point (P2MP) Label Switched Path (LSP) or an IP multicast tunnel. Routers 20, 22 and 24 within computer network 12 utilize extensions to the LDP that enable upstream label assignment.

Upstream router 20 and downstream routers 22 and 24 maintain routing information that describes available routes through computer network 12. Upon receiving an incoming packet, the routers examine information within the packet and forward the packet in accordance with the routing information. In order to maintain an accurate representation of network 12, the routers exchange routing information, e.g., bandwidth availability of links, in accordance with a defined routing protocol, such as an Interior Gateway Protocol (IGP).

In the example of FIG. 1, router 20 uses LDP extended to include upstream label assignment to carry traffic on tunnel 18 between source network 10 and subscriber networks 14A and 14B ("subscriber networks 14"). Source network 10 may comprise any public or private network or the Internet that provides multicast traffic to router 20 in network 12. Subscriber networks 14 may include LANs or wide area networks (WANs) that comprise a plurality of subscriber devices. The subscriber devices may include personal computers, laptops, workstations, personal digital assistants (PDAs), wireless devices, network-ready appliances, file servers, print servers or other devices that access source network 10 via network 12.

The extensions to the LDP enable routers 20, 22 and 24 to advertise upstream label assignment capability to neighboring routers in network 12. The extensions to LDP also enable upstream router 20 to distribute upstream assigned labels to downstream routers 22 and 24 upon receiving advertisements indicating upstream label assignment capability from downstream routers 22 and 24. In the case where tunnel 18 comprises an LDP P2MP LSP, upstream label assignment described herein enables a branch router, such as router 20, to avoid replicating traffic to routers 22 and 24 on a Local Area Network (LAN).

In some cases, subscriber devices within subscriber networks 14 request multicast streams, such as IPTV channels, from source network 10. LDP with upstream label assignment extensions enables transmission of multicast traffic over tunnel 18 from source network 10 to subscriber networks 18 without requiring upstream router 20 to perform traffic replication. For example, upstream router 20 may allocate the same upstream assigned label to downstream router 22 and downstream router 24 such that upstream router 20 may forward traffic from source network 10 in a single packet with the upstream assigned label to both routers 22 and 24.

In accordance with principles of the invention, LDP is extended to include upstream label assignment capability and upstream assigned label distribution. LDP may also include a tunnel identifier that identifies tunnel 18, e.g., LDP P2MP LSP or IP multicast tunnel, as carrying upstream label assignments and traffic from upstream router 20 to downstream routers 22 and 24. In this way, the techniques enabling binding of the upstream assigned label to the tunnel 18. For example, LDP associates a forwarding equivalence class (FEC) with each LSP in network 12. In the case where tunnel 18 comprises a LDP P2MP LSP, upstream router 20 with upstream label assignment capability binds an upstream assigned label to the FEC for tunnel 18.

As described in more detail below, a RSVP-TE tunnel identifier enables an LDP P2MP LSP to be nested in an RSVP-TE P2MP LSP. Nesting is needed when an "inner" LDP P2MP LSP is established over multiple edge domains via an "outer" RSVP-TE P2MP LSP established within a backbone domain. Upstream label assignment extensions to LDP allow an upstream router within the backbone domain to tunnel the inner LDP P2MP LSP with upstream assigned labels over the outer RSVP-TE P2MP LSP within the backbone domain that has downstream assigned labels. The tunnel identifier allows the upstream router to signal upstream assigned labels for the inner LDP P2MP LSP with a tunnel identifier for the outer RSVP-TE P2MP LSP to the downstream routers of the outer RSVP-TE P2MP LSP. In this way, the upstream router effectively binds the LDP P2MP LSP to the outer RSVP-TE P2MP LSP.

An exemplary application of LDP with upstream label assignment extensions will be described in which network 12 comprises a LAN and tunnel 18 within network 12 comprises an LDP P2MP LSP. Conventionally, LDP P2MP LSPs on a LAN require "ingress replication" in which a branch router for the P2MP LSP on the LAN replicates a received packet and sends a separate copy of the packet on the P2MP LSP to each of the downstream routers on the LAN that are adjacent to the branch router. In order to increase efficiency of bandwidth utilization, it is desirable for the branch router of the P2MP LSP on the LAN to send a single copy of the packet to multiple downstream routers that are adjacent to the branch router of the P2MP LSP.

As illustrated in FIG. 1, the upstream label assignment extensions to LDP enable each of downstream routers 22 and 24 to associate a label L allocated by upstream router 20 and used by upstream router 20 to transmit packets with the P2MP LSP on the LAN. Each of downstream routers 22 and 24 receives the FEC associated with the LDP P2MP LSP from a downstream LDP peer. In this example, the upstream interface to reach upstream router 20, which is the next-hop toward the P2MP LSP root address in the FEC associated with the LDP P2MP LSP, is a LAN interface.

First, upstream router 20 receives advertisements indicating upstream label assignment capability from neighboring routers in network 12, including router 22 and router 24. If downstream routers 22 and 24 are capable of supporting upstream assigned labels, each of downstream routers 22 and 24 may send a Label Request message to upstream router 20. The Label Request message contains an Upstream Assigned Label Request type-length-value (TLV). Upon receiving the Label Request messages from downstream routers 22 and 24, upstream router 20 sends back a Label Mapping message to downstream routers 22 and 24 with an upstream assigned label. In some cases, downstream routers 22 and 24 may not send upstream assigned Label Request messages to upstream router 20.

As shown in FIG. 1, if upstream router 20 receives a Label Request for an upstream assigned label for the same FEC associated with the LDP P2MP LSP from multiple downstream routers 22, 24 on the LAN, upstream router 20 sends the same upstream assigned label, L, to each of the multiple downstream routers 22, 24. Upstream router 20 can then transmit a single packet for the P2MP LSP on the LAN to downstream routers 22 and 24 with the upstream assigned label L. However, downstream routers 22 and 24 may have more than one equal cost next-hop on the LAN to reach the P2MP LSP root address. In this case, if it is desirable for router 22 and 24 to send the Label Request to the same upstream router, downstream routers 22 and 24 may be configured to send the upstream assigned Label Request to the next-hop router with the lowest Router ID.

In the case where tunnel 18 includes a plurality of downstream routers (not shown), if a subset of the downstream routers do not support upstream label assignment, upstream router 20 may still use upstream label assignment for the remaining sub-set of the downstream routers. Upstream router 20 will then use ingress replication and downstream label assignment for downstream routers that do not support upstream label assignment.

Figure 2:
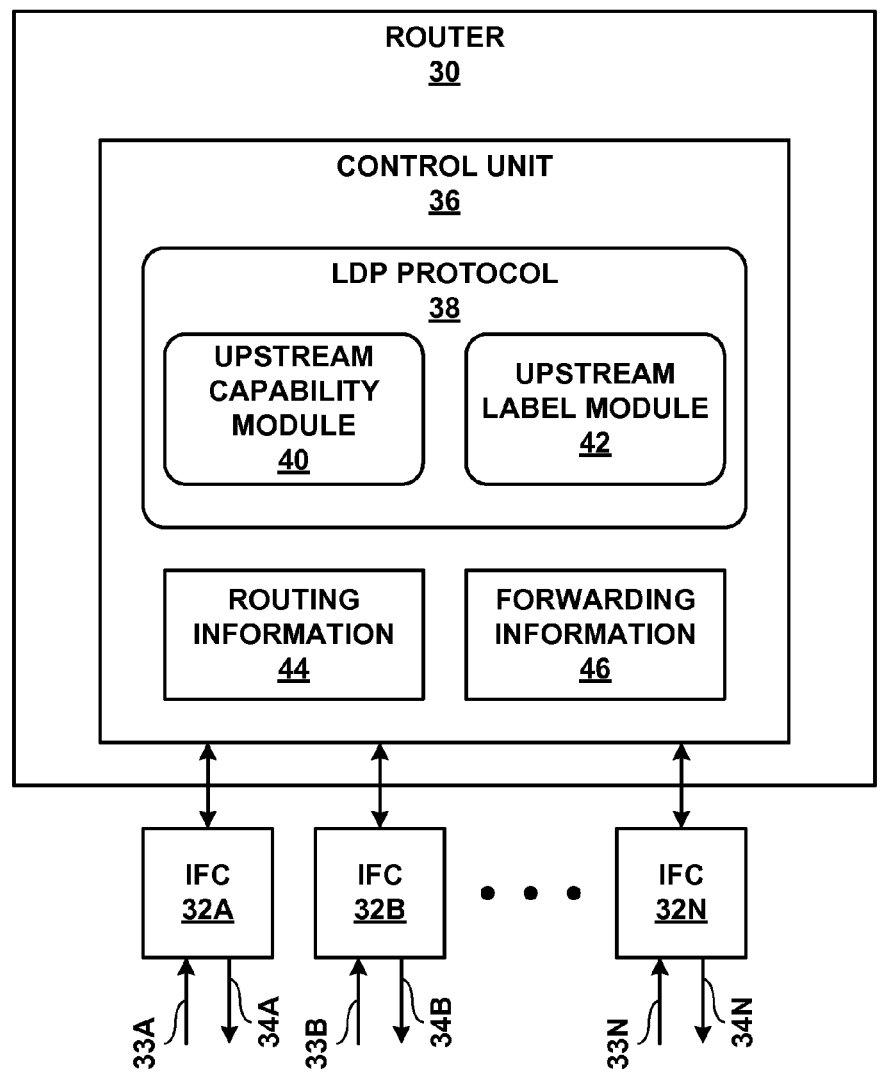
FIG. 2 is a block diagram illustrating an exemplary router capable of supporting LDP with upstream label assignment extensions in accordance with the techniques described herein.

FIG. 2 is a block diagram illustrating an exemplary router 30 capable of supporting LDP with upstream label assignment extensions in accordance with the techniques described herein. As one example, router 30 may comprise an upstream router or root of a tunnel established across a network. Router 30 may also comprise a downstream router or leaf of a tunnel established across the network by an upstream router. Router 30 may operate substantially similar to any of routers 20, 22 and 24 from FIG. 1.

In the example illustrated in FIG. 2, router 30 includes interface cards 32A-32N ("IFCs 32") that receive multicast packets via inbound links 33A-33N ("inbound links 33") and send multicast packets via outbound links 34A-34N ("outbound links 34"). IFCs 32 are typically coupled to links 33, 34 via a number of interface ports. Router 30 also includes a control unit 36 that determines routes of received packets and forwards the packets accordingly via IFCs 32.

Control unit 36 maintains routing information 44 that describes the topology of a network and, in particular, routes through the network. Routing information 44 may include, for example, route data that describes various routes within the network, and corresponding next hop data indicating appropriate neighboring devices within the network for each of the routes. Router 30 updates routing information 44 to accurately reflect the topology of the network.

Control unit 36 also maintains forwarding information 46 that associates network destinations with specific next hops and corresponding interface ports. In general, when router 30 receives a multicast packet with a downstream assigned label via one of inbound links 33, control unit 36 determines a destination and associated next hop for the packet in accordance with routing information 44 and forwards the packet on one of outbound links 34 to the corresponding next hop in accordance with forwarding information 46 based on the destination of the packet.

In accordance with the invention, control unit 36 provides an operating environment for LDP 38 to execute. LDP 38 includes an upstream capability module 40 and an upstream label module 42 to support upstream assigned labels. In the case where router 30 comprises an upstream router or root of a tunnel, router 30 establishes the tunnel across a network having two or more downstream routers or leaves. Upstream capability module 40 then sends advertisements to neighboring routers in the network indicating that router 30 is capable of supporting upstream assigned labels. In addition, upstream capability module 40 receives advertisements from the neighboring routers in the network indicating that at least some of neighboring routers are capable of supporting upstream assigned labels.

Upon receiving the advertisement from router 30, downstream routers in the tunnel capable of supporting upstream assigned labels may send upstream assigned Label Requests to router 30. Upon receiving the advertisements and the Label Requests from the downstream routers, upstream label module 42 within router 30 allocates an upstream assigned label to each of the capable downstream routers of the tunnel that requested an upstream assigned label. Router 30 uses the upstream assigned label to forward packets to the downstream routers capable of supporting upstream assigned labels. In addition, control unit 36 may receive downstream assigned labels in Label Mapping messages from downstream routers of the tunnel that do not support upstream assigned labels. In that case, router 30 uses the downstream assigned labels to forward packet to the downstream routers that are not capable of supporting upstream assigned labels.

Upstream label module 42 may also send a tunnel identifier in the Path message to each of the downstream routers of the tunnel that identifies the tunnel as carrying upstream assigned labels and packets from router 30. In this way, the tunnel identifier enables binding of the upstream label to the tunnel. In the case of P2MP LSP nesting, upstream label module 42 may send an upstream assigned label for an "inner" LDP P2MP LSP to downstream routers of an "outer" RSVP-TE P2MP LSP with a tunnel identifier that identifies the "outer" RSVP-TE P2MP LSP. In this way, the tunnel identifier enables binding of the inner LSP P2MP LSP to the outer RSVP-TE P2MP LSP.

In the case where router 30 comprises a downstream router or leaf of a tunnel, upstream capability module 40 sends advertisements to neighboring routers in the network indicating that router 30 is capable of supporting upstream assigned labels. In addition, upstream capability module 40 receives advertisements from the neighboring routers in the network indicating that at least some of neighboring routers are capable of supporting upstream assigned labels.

Upstream label module 42 receives an upstream assigned label in a Path message from the upstream router or root of the tunnel. Router 30 reserves the label in a context specific label space within upstream label spaces 48 for that upstream router.

Upon receiving an advertisement from an upstream router of the tunnel indicating that the upstream router is capable of supporting upstream label assignment, router 30 may send an upstream assigned Label Request to the upstream router. Upon receiving the advertisement and the Label Request from router 30, the capable upstream router of the tunnel allocates an upstream assigned label to router 30. Upstream label module 42 recognizes that an upstream assigned label was received from the upstream router, and knows not to send a downstream assigned label to the upstream router in a Label Mapping message. Upstream label module 42 may also receive a tunnel identifier from the upstream router of the tunnel that identifies the tunnel as carrying upstream assigned labels and packets from the upstream router. Router 30 receives packets from the upstream router with the upstream assigned label.

The architecture of router 30 illustrated in FIG. 2 is shown for exemplary purposes only. The invention is not limited to this architecture. In other embodiments, router 30 may be configured in a variety of ways. In one embodiment, for example, some of the functionally of control unit 36 may be distributed within IFCs 32. In another embodiment, control unit 36 may include a routing engine that performs routing functions and maintains routing information base (RIB), e.g., routing information 44, and a forwarding engine that performs packet forwarding based on a forwarding information base (FIB), e.g., forwarding information 46, generated in accordance with the RIB.

Control unit 36 may be implemented solely in software, or hardware, or may be implemented as a combination of software, hardware, or firmware. For example, control unit 36 may include one or more processors which execute software instructions. In that case, the various software modules of control unit 36 may comprise executable instructions stored on a computer-readable medium, such as computer memory or hard disk.

Figure 3A:
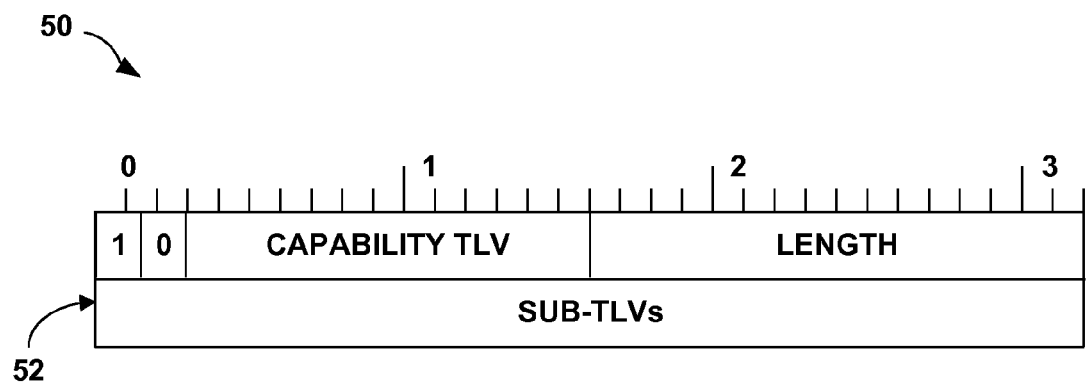
FIGS. 3A and 3B illustrate an exemplary LDP Capability TLV that includes an Upstream Label Assignment Capability sub-TLV used to indicate whether a router supports upstream assigned labels.
Figure 3B:
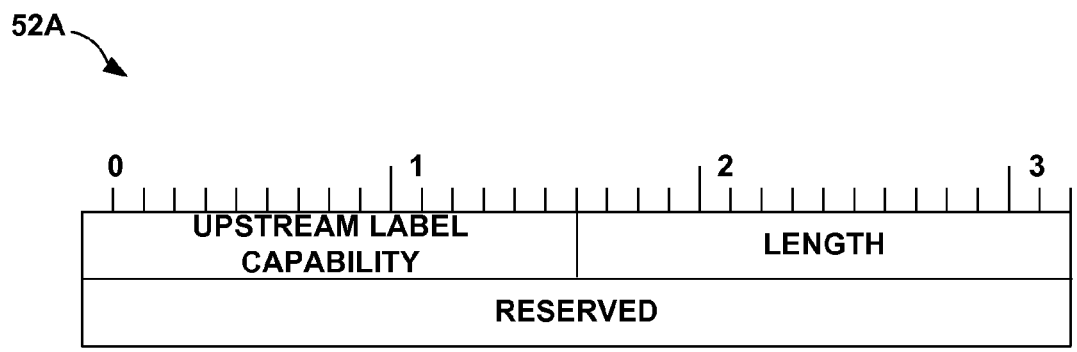

FIGS. 3A and 3B illustrate an exemplary LDP Capability TLV 50 that includes an Upstream Label Assignment Capability sub-TLV 52A used to indicate whether a router supports upstream assigned labels. In accordance with the invention, LDP Capability TLV 50 is defined in an LDP Initialization message sent from a router to neighboring routers in a network and indicates a set of capabilities supported by the router.

As shown in FIG. 3A, LDP Capability TLV 50 includes a type field, a length field, and one or more sub-TLVs 52 that each signal a specific capability. Upstream Label Assignment Capability sub-TLV 52A is defined in LDP Capability TLV 50 to indicate that a router supports upstream label assignment. As shown in FIG. 3B, Upstream Label Assignment Capability sub-TLV 52A includes a type field, a length field, and a reserved field.

The usage of LDP Initialization messages for exchanging upstream label assignment capability implies that a router may exchange LDP Initialization messages with a neighboring router before sending or receiving any other LDP messages with that neighboring router. A downstream router cannot send an upstream Label Request message to an upstream router of a tunnel unless the downstream router knows that the upstream router supports upstream assigned labels. In turn, an upstream router cannot allocate upstream assigned labels to downstream routers of a tunnel unless the upstream router knows that at least some of the downstream routers support upstream assigned labels. Upstream Label Assignment Capability sub-TLV 52A within LDP Capability TLV 50 provides a mechanism for routers to advertise upstream label assignment capability to neighboring routers in a network.

When the Upstream Label Assignment Capability sub-TLV 52A is included in the LDP Initialization message, the router is capable of both distributing upstream assigned labels and receiving upstream assigned labels. When the Upstream Label Assignment Capability sub-TLV 52A is not included in the LDP Initialization message, the router is not capable of either distributing or receiving upstream assigned labels. The reserved bits are be set to zero on transmission and ignored on receipt.

Figure 4:
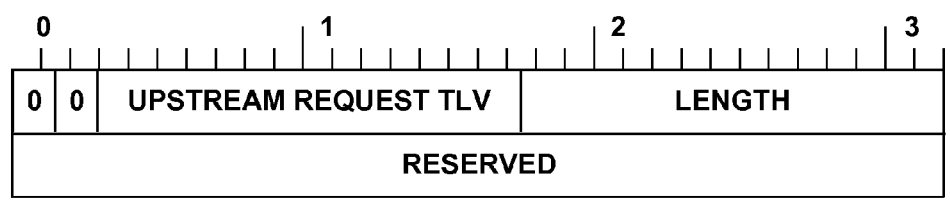
FIG. 4 illustrates an exemplary Upstream-Assigned Label Request TLV that signals upstream assigned Label Requests.

FIG. 4 illustrates an exemplary Upstream-Assigned Label Request TLV 56 that signals upstream assigned Label Requests. In accordance with the invention, Upstream-Assigned Label Request TLV 56 is defined in a Label Request message sent from a downstream router to an upstream router of a tunnel indicated to be capable of supporting upstream assigned labels. As shown in FIG. 4, Upstream-Assigned Label Request TLV 56 includes a type field, a length field, and a reserved field.

A downstream router does not send Upstream Assigned Label Request TLV 56 in a Label Request message to an upstream router of a tunnel if the upstream router did not advertise the Upstream Label Assignment Capability sub-TLV 52A of LDP Capability TLV 50 (from FIGS. 3A and 3B) in LDP Initialization messages.

Figure 5:
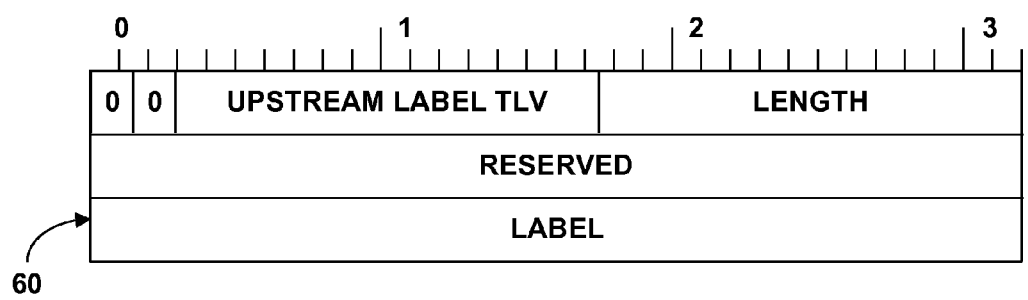
FIG. 5 illustrates an exemplary Upstream-Assigned Label TLV that signals upstream assigned labels.

FIG. 5 illustrates an exemplary Upstream-Assigned Label TLV 58 that signals upstream assigned labels. In accordance with the invention, Upstream-Assigned Label TLV 58 is defined in a message used to advertise, release and withdraw upstream assigned label mappings. Upstream-Assigned Label TLV 58 is sent in messages from an upstream router to downstream routers of a tunnel indicated to be capable of supporting upstream assigned labels and that requested an upstream assigned label. As shown in FIG. 5, Upstream-Assigned Label TLV 58 includes a type field, a length field, a reserved field, and a label field 60. In some cases, Upstream Assigned Label TLV 58 may be included in Label Withdraw and Label Release messages that withdraw and release particular upstream assigned labels.

An upstream router does not send Upstream Assigned Label TLV 58 in a Label Mapping message to a downstream router of a tunnel if the downstream router did not advertise the Upstream Label Assignment Capability sub-TLV 52A of LDP Capability TLV 50 (from FIGS. 3A and 3B) in LDP Initialization messages. The distribution of upstream assigned labels is similar to either ordered LSP control or independent LSP control of downstream assigned labels.

When the label distributed in a Label Mapping message is an upstream assigned label, the upstream router includes Upstream Assigned Label TLV 58 in the Label Mapping message. When a downstream router receives a Label Mapping message with Upstream Assigned Label TLV 58 and does not recognize the TLV, the downstream router generates a Notification message with a status code of "Unknown TLV". If the downstream router does recognize the TLV but is unable to process the upstream assigned label, the downstream router generates a Notification message with a status code of "No Label Resources".

If an upstream router generated the Label Mapping message in response to a Label Request message from a downstream router of a tunnel, the downstream router includes Upstream Assigned Label Request TLV 56 in the Label Request message. A downstream router that generates an upstream assigned Label Request to an upstream router for a given FEC does not send a downstream assigned label in a Label Mapping message to the upstream router for that FEC unless the downstream router withdraws the upstream assigned label. Similarly if a downstream router generates a downstream assigned Label Request to a neighbor LSR for a given FEC, the downstream router does not send an upstream assigned Label Request to the upstream router for that FEC, unless the downstream router withdraws the downstream assigned Label Request.

Figure 6:
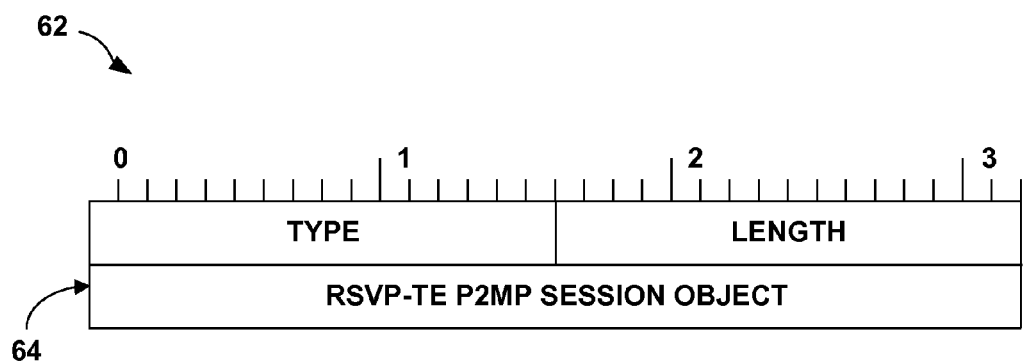
FIGS. 6 and 7 illustrate exemplary LDP Interface ID TLVs that signals a Tunnel Identifier.
Figure 7:
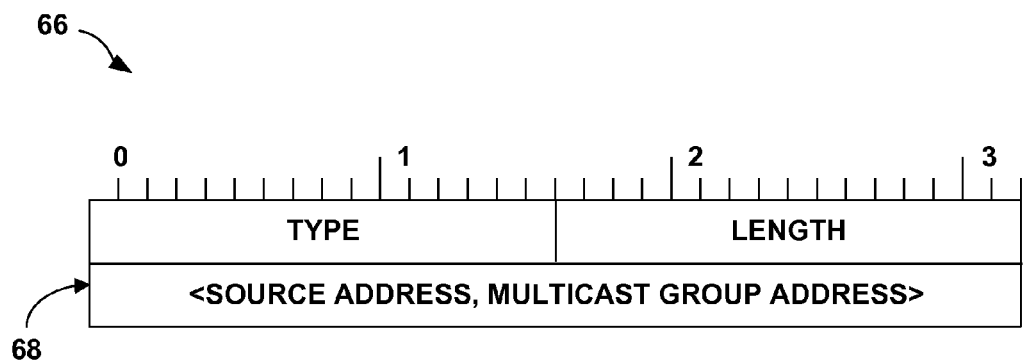

FIGS. 6 and 7 illustrate exemplary LDP Interface ID TLVs that signals a Tunnel Identifier. An upstream router may transmit a MPLS packet with an upstream assigned label, L, to a downstream router by encapsulating the MPLS packet in an IP tunnel or a MPLS tunnel. In this case, the downstream router may determine that L is an upstream assigned label based on the tunnel on which the downstream router receives the packet. The TLVs illustrated in FIGS. 5 and 6 provide a mechanism for the upstream router to inform the downstream router that the upstream router will use a particular tunnel for transmitting MPLS packets with upstream assigned labels.

When using LDP for upstream label assignment, the Interface ID TLV may be used to signal the Tunnel Identifier. If the upstream router uses an IP or MPLS tunnel to transmit MPLS packets with upstream assigned labels to the downstream router, the upstream router includes the Interface ID TLV in Label Mapping messages along with the Upstream Assigned Label TLV 58 from FIG. 5. In accordance with the invention, two new Interface ID TLVs are defined to support RSVP-TE P2MP LSPs and IP Multicast Tunnels, respectively. The TLV value acts as the Tunnel Identifier.

FIG. 6 illustrates an exemplary RSVP-TE P2MP LSP TLV 62 in the Interface ID TLV. RSVP-TE P2MP LSP TLV 62 includes a type field, a length field, and a value field 64 that acts as the Tunnel Identifier. In this case, value field 64 comprises the RSVP-TE P2MP Session Object and optionally the P2MP Sender Template Object. The TLV value field 64 identifies the RSVP-TE P2MP LSP.

This mechanism enables an LDP P2MP LSP to nest within a RSVP-TE P2MP LSP. The Tunnel Identifier allows an upstream router to tunnel an "inner" LDP P2MP LSP, the label for which is upstream assigned, over an "outer" RSVP-TE P2MP LSP that has multiple downstream routers. The RSVP-TE P2MP LSP TLV allows the upstream router to signal the binding of the inner LDP P2MP LSP to the outer RSVP-TE P2MP LSP to the multiple downstream routers. The control plane signaling between the upstream router and the multiple downstream routers for the inner LDP P2MP LSP uses targeted LDP signaling messages.

FIG. 7 illustrates an exemplary IP Multicast Tunnel TLV 66 in the Interface ID TLV. IP Multicast Tunnel TLV 66 includes a type field, a length field, and a value field 68 that acts as the Tunnel Identifier. In this case, value field 68 comprises a <Source Address, Multicast Group Address>tuple. The TLV value field 68 identifies the IP Multicast Tunnel.

Figure 8:
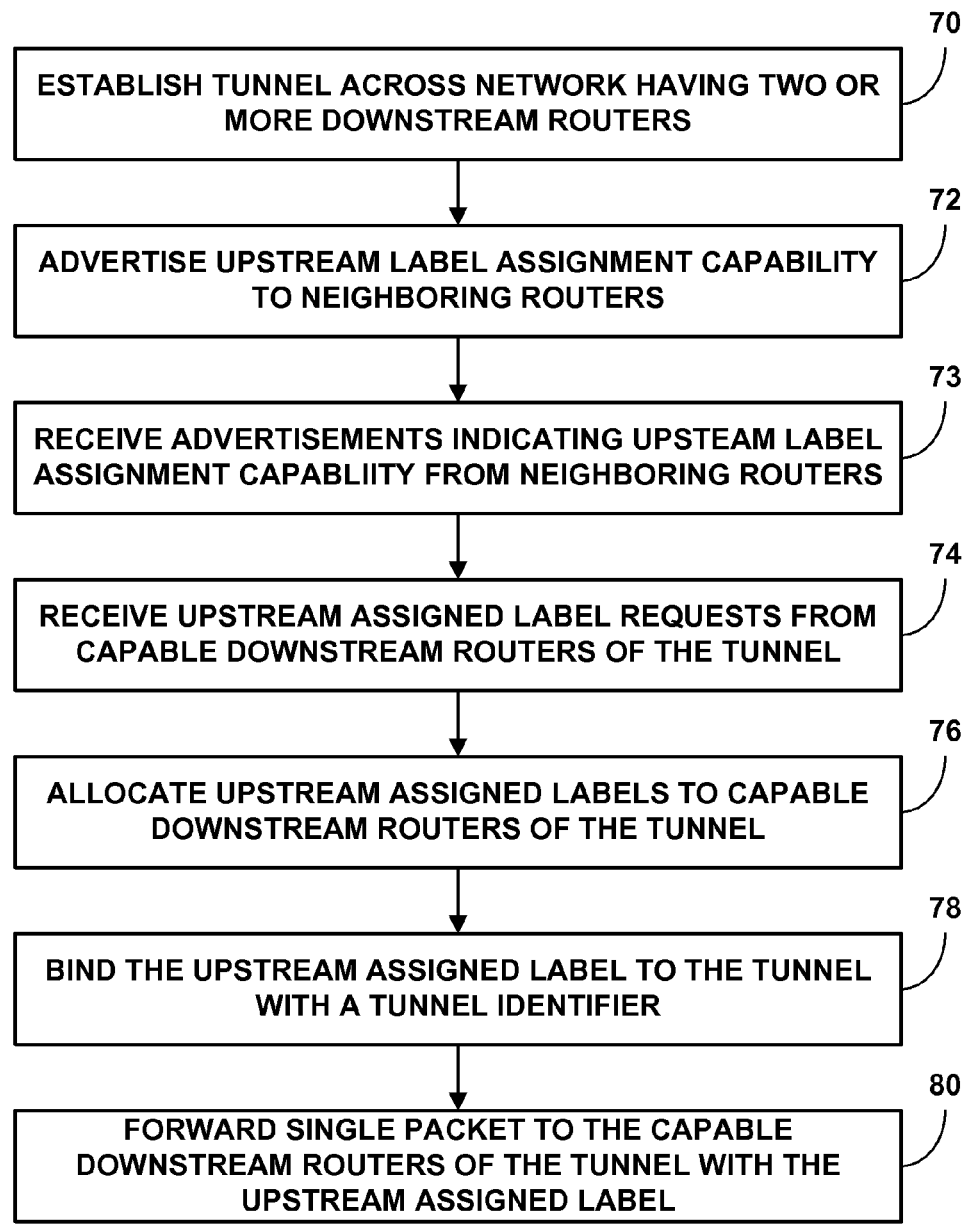
FIG. 8 is a flowchart illustrating an exemplary operation of distributing upstream assigned labels using LDP.

FIG. 8 is a flowchart illustrating an exemplary operation of distributing upstream assigned labels using LDP. The operation will be described herein reference to router 30 from FIG. 2. Upstream router 30 establishes a tunnel across a network between upstream router 30 and two or more downstream routers (70). The tunnel may comprise an IP tunnel, such as an IP multicast tunnel, or a MPLS tunnel, such as a LDP P2MP LSP.

Upstream capability module 40 advertises upstream label assignment capability to neighboring routers in the network (72). The advertisements may comprise LDP Initialization messages including a LDP Capability TLV with an Upstream Label Assignment Capability sub-TLV. In turn, upstream capability module 40 may receive advertisements indicating upstream label assignment capability from the neighboring routers in the network (73).

Upstream label module 42 receives upstream assigned Label Request messages from downstream routers of the tunnel capable of supporting upstream assigned labels (74). The capable downstream routers may send the upstream assigned Label Request messages in response to receiving the advertisement from upstream router 30. The upstream assigned Label Request may comprise an Upstream-Assigned Label Request TLV. Upstream label module 42 then allocates an upstream assigned label to the capable downstream routers of the tunnel in a Label Mapping message (76). The label allocation may comprise an Upstream-Assigned Label TLV.

Upstream label module 42 may also send a tunnel identifier in the Label Mapping message to the capable downstream routers that identifies the tunnel as carrying upstream assigned labels from upstream router 30. The tunnel identifier may comprise LDP Interface ID TLVs that signal either a RSVP-TE P2MP LSP or an IP Multicast Tunnel. In this way, upstream router 30 binds the upstream assigned label to the tunnel with the tunnel identifier (78).

Upstream router 30 then forwards a single packet received from source network 10 to the capable downstream routers of the tunnel with the upstream assigned label (80). Upstream router 30 may also send packets to downstream routers of the tunnel that are not capable of supporting upstream assigned labels. In this case, upstream router 30 receives downstream assigned labels from each of the incapable downstream router of the tunnel. Upstream router 30 then performs ingress replication and sends copies of the packets to each of the incapable downstream routers with the associated downstream assigned label.

Figure 9:
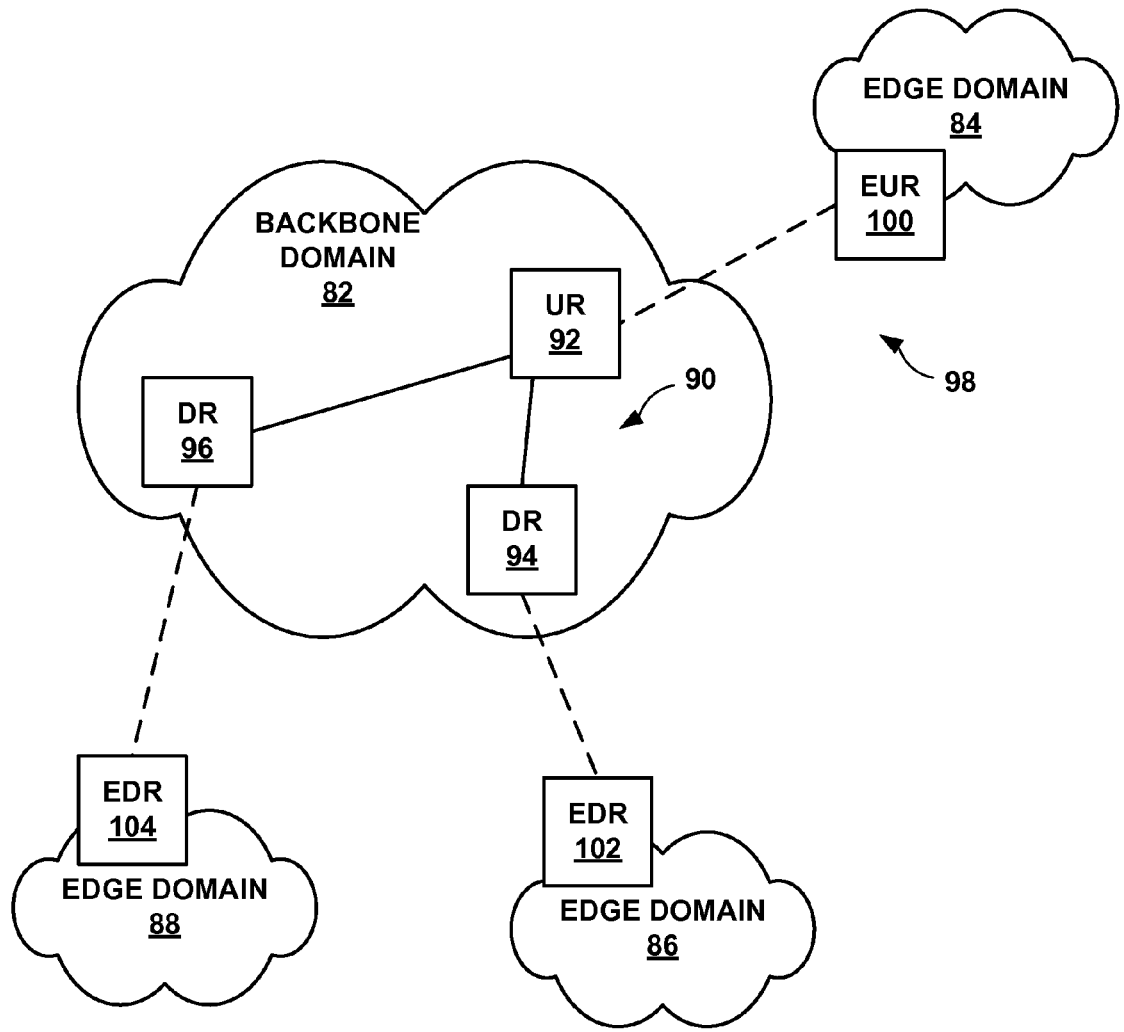
FIG. 9 is a block diagram illustrating a computer system including a backbone domain and edge domains.

FIG. 9 is a block diagram illustrating a computer system including a backbone domain 82 and edge domains 84, 86 and 88. Backbone domain 82 includes an upstream router (UR) 92 and downstream routers (DR) 94 and 96. UR 92 establishes a RSVP-TE P2MP LSP 90 over backbone domain 82 between UR 92 and DRs 94 and 96. RSVP-TE P2MP LSP 90 utilizes downstream assigned labels. Edge domain 84 includes an edge upstream router (EUR) 100, edge domain 86 includes edge downstream router (EDR) 102, and edge domain 88 includes EDR 104. EUR 100 establishes a LDP P2MP LSP 98 over edge domains 84, 86 and 88 via RSVP-TE P2MP LSP 90 within backbone domain 82 between EUR 100 and EDRs 102 and 104.

As described above, the RSVP-TE tunnel identifier enables P2MP LDP nesting. RSVP-TE P2MP LSP 90 within backbone domain 82 comprises an "outer" RSVP-TE P2MP LSP, and LDP P2MP LSP 98 across edge domains 84, 86 and 88 comprises an "inner" LDP P2MP LSP. The upstream label assignment extensions to LDP described herein allow UR 92 within backbone domain 82 to tunnel LDP P2MP LSP 98 with upstream assigned labels over RSVP-TE P2MP LSP 90 within backbone domain 82. The tunnel identifier described herein allows UR 92 to signal upstream assigned labels for LDP P2MP LSP 98 with an identifier for RSVP-TE P2MP LSP 90 to DRs 94 and 96 of RSVP-TE P2MP LSP 90. In this way, UR 92 effectively binds LDP P2MP LSP 98 to RSVP-TE P2MP LSP 90.

P2MP LSP nesting allows all of the routers within backbone domain 82 to maintain control and forwarding state only for RSVP-TE P2MP LSP 90 within backbone domain 82. The control and forward state for LDP P2MP LSP 98 is nested within RSVP-TE P2MP LSP 90. Therefore, only the routers within backbone domain 82 associated with RSVP-TE P2MP LSP 90 (i.e., UR 92, DR 94, and DR 96) maintain the control and forwarding state for LDP P2MP LSP 98.

Figure 10:
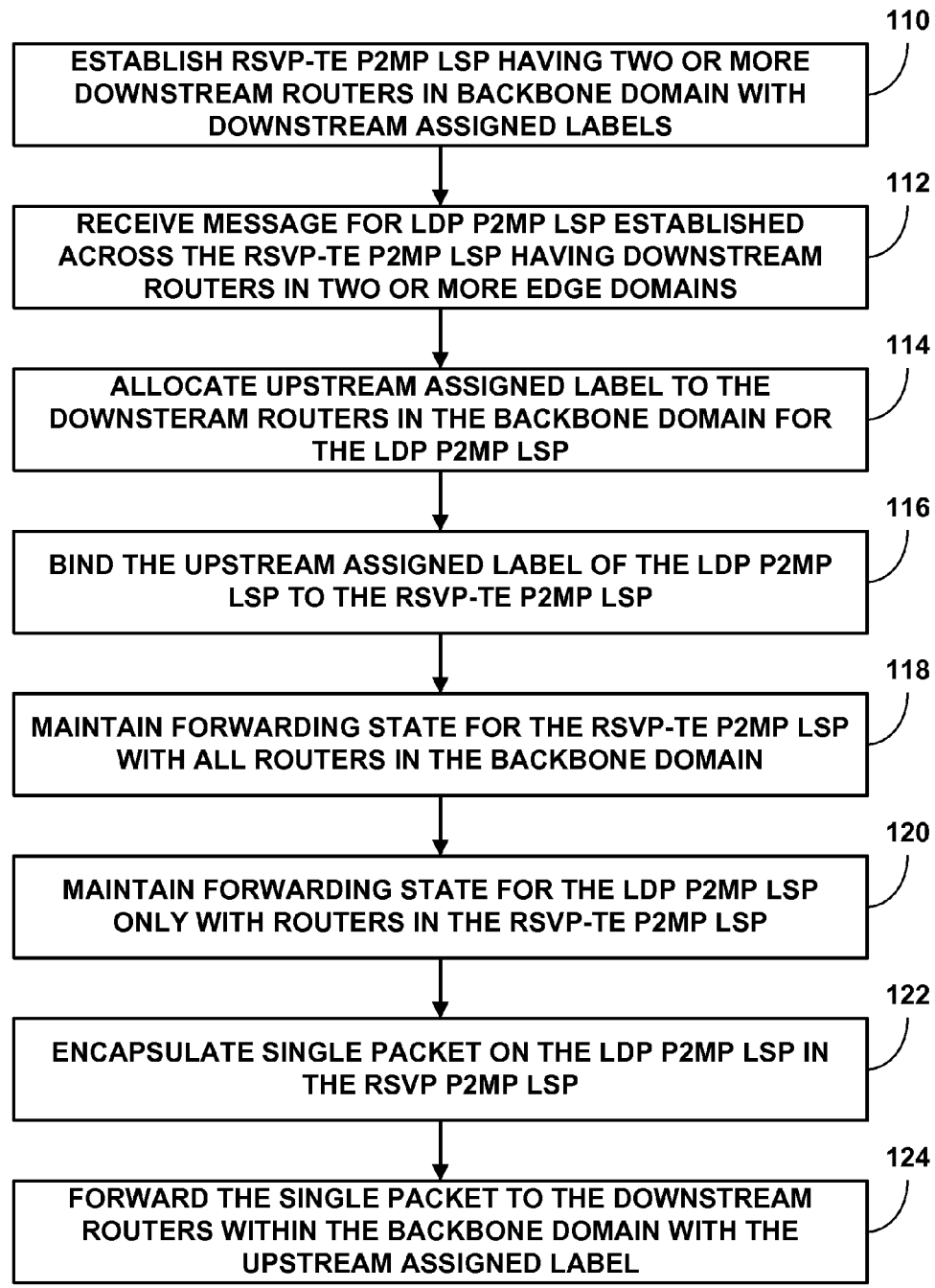
FIG. 10 is a flowchart illustrating an exemplary operation of nesting an LDP P2MP LSP in an RSVP-TE P2MP LSP using upstream assigned labels.

FIG. 10 is a flowchart illustrating an exemplary operation of nesting an LDP P2MP LSP in an RSVP-TE P2MP LSP using upstream assigned labels. The operation will be described herein in reference to UR 92 within backbone domain 82 from FIG. 9. UR 92 establishes RSVP-TE P2MP LSP 90 across backbone domain 82 between UR 92 and DRs 94 and 96 with downstream assigned labels (110). UR 92 then receives a message from EUR 100 within edge domain 84 for LDP P2MP LSP 98 established over edge domains 84, 86 and 88 via RSVP-TE P2MP LSP 90 within backbone domain 82 between EUR 100 and EDRs 102 and 104 (112).

For purposes of explanation, it is assumed that DRs 94 and 96 within backbone domain 82 advertise that they are capable of supporting upstream label assignment to UR 92 and may send upstream assigned Label Request to UR 92. UR 92 then allocates an upstream assigned label for LDP P2MP LSP 98 in a Label Mapping message to DRs 94 and 96 within the backbone domain 82 (114). UR 92 also sends a tunnel identifier in the Label Mapping message to DRs 94 and 96 within backbone domain 82 that identifies RSVP-TE P2MP LSP 90. In this way, UR 92 binds LDP P2MP LSP 98 to RSVP-TE P2MP LSP 90 with the tunnel identifier (116).

UR 92 and all the routers within backbone domain 82 maintain control and forwarding state for RSVP-TE P2MP LSP 90 within backbone domain 82. The control and forward state for LDP P2MP LSP 98 is nested within RSVP-TE P2MP LSP 90. Therefore, only UR 92, DR 94, and DR 96 of RSVP-TE P2MP LSP 90 within backbone domain 82 maintain the control and forwarding state for LDP P2MP LSP 98. UR 92 then encapsulates a single packet received on LDP P2MP LSP 98 in RSVP-TE P2MP LSP 90 (122) and forwards the single packet to DRs 94 and 96 of RSVP-TE P2MP LSP 90 within backbone domain 82 with the upstream assigned label (124).

Various embodiments of the invention have been described. These and other embodiments are within the scope of the following claims.

The invention claimed is:

1. A method comprising:
   establishing a Resource Reservation Protocol with Traffic Engineering (RSVP-TE) Point to Multi-Point (P2MP) Label Switched Path (LSP) for carrying traffic across a backbone domain from an ingress router to two or more egress routers, wherein the ingress router and the two or more egress routers are positioned within the backbone domain, and wherein the ingress router is positioned between the egress routers and a source of the traffic;
   establishing a Label Distribution Protocol (LDP) P2MP LSP between two or more edge domains that are external to the backbone domain by nesting the LDP P2MP LSP within the RSVP-TE P2MP LSP to carry the traffic across the backbone domain;
receiving, from one of the edge domains via the LDP P2MP LSP, a packet at the ingress router of the backbone domain; and
encapsulating the packet within the RSVP-TE P2MP LSP at the ingress router and forwarding the packet across the backbone domain to the egress routers via the RSVP-TE P2MP LSP.

2. The method of claim 1, wherein nesting the LDP P2MP LSP within the RSVP-TE P2MP LSP comprises maintaining control and forwarding state for the LDP PSMP within the backbone domain only at the ingress router and the two or more egress routers for the RSVP-TE P2MP LSP.

3. The method of claim 1, wherein nesting the LDP P2MP LSP within the RSVP-TE P2MP LSP comprises establishing the RSVPN-TE P2MP LSP as an outer P2MP LSP and establishing the LDP P2MP LSP as an inner P2MP LSP carried by the outer P2MP LSP through the backbone domain.

4. The method of claim 1, wherein establishing the LDP P2MP LSP comprises sending an LDP message from the upstream router to the two or more downstream routers within the backbone domain, wherein the LDP message comprises both: (1) an upstream assigned label allocated for the LDP P2MP LSP being established, and (2) a tunnel identifier that identifies the RSVP-TE P2MP LSP within which the P2MP LSP is to be nested.

5. The method of claim 1,
receiving, with an ingress router of the LDP P2MP LSP, LDP Initialization messages that include upstream label assignment capability indications from the two or more egress routers, wherein the upstream label assignment capability indications comprise a LDP Capability Type-Length-Value (TLV) with an Upstream Label Assignment Capability sub-TLV that indicates that the egress routers are capable of supporting labels that are assigned by the ingress router; and
allocating an upstream assigned label with the ingress router of the LDP P2MP LSP for the two or more egress routers from which the upstream label assignment capability indications were received.

6. A router within a backbone domain comprising:
a processor executing a signaling protocol to establish a Resource Reservation Protocol with Traffic Engineering (RSVP-TE) Point to Multi-Point (P2MP) Label Switched Path (LSP) for carrying traffic across a backbone domain from the ingress router to two or more egress routers, wherein the ingress router and the two or more egress routers are positioned within the backbone domain such that the ingress router is between the egress routers and a source of the traffic, and
wherein the signaling protocol establishes a Label Distribution Protocol (LDP) P2MP LSP between two or more edge domains that are external to the backbone domain by nesting the LDP P2MP LSP within the RSVP-TE P2MP LSP to carry the traffic across the backbone domain; and
a forwarding engine that receives, from one of the edge domains via the LDP P2MP LSP, a packet and encapsulates the packet within the RSVP-TE P2MP LSP for forwarding the packet across the backbone domain to the egress routers via the RSVP-TE P2MP LSP.

7. The ingress router of claim 6,
wherein the signaling protocol includes an upstream label module that sends a Label Mapping message to the egress routers within the backbone domain that includes an upstream assigned label allocated for the LDP P2MP LSP and a tunnel identifier that identifies the RSVP-TE P2MP LSP to establish P2MP LSP nesting.

8. A system comprising:
a backbone domain that includes an upstream router and two or more downstream routers, wherein the upstream router establishes a Resource Reservation Protocol with Traffic Engineering (RSVP-TE) Point to Multi-Point (P2MP) Label Switched Path (LSP) across the backbone domain between the upstream router and the downstream routers; and
an edge domain that includes an ingress router that establishes a Label Distribution Protocol (LDP) P2MP LSP over two or more edge domains via the RSVP-TE P2MP LSP within the backbone domain,
wherein the upstream router within the backbone domain sends a Label Mapping message to the downstream routers within the backbone domain that includes an upstream assigned label allocated for the LDP P2MP LSP by the ingress router within the edge domain and a tunnel identifier that identifies the RSVP-TE P2MP LSP to establish P2MP LSP nesting.

* * * * *